United States Patent
Ross, Jr.

(10) Patent No.: US 9,304,027 B2
(45) Date of Patent: Apr. 5, 2016

(54) ANGLED GAUGE HEAD FOR LIQUID LEVEL SENDING UNIT

(75) Inventor: Herbert G. Ross, Jr., Argyle, TX (US)

(73) Assignee: Texas LFP, LLC, Dallas, TX (US)

( * ) Notice: Subject to any disclaimer, the term of this patent is extended or adjusted under 35 U.S.C. 154(b) by 938 days.

(21) Appl. No.: 13/447,176

(22) Filed: Apr. 14, 2012

(65) Prior Publication Data
US 2012/0260844 A1 Oct. 18, 2012

Related U.S. Application Data

(60) Provisional application No. 61/476,096, filed on Apr. 15, 2011.

(51) Int. Cl.
*G01F 23/00* (2006.01)
*F16B 2/06* (2006.01)
*A47G 7/04* (2006.01)

(52) U.S. Cl.
CPC ............. *G01F 23/00* (2013.01); *A47G 7/044* (2013.01); *F16B 2/06* (2013.01)

(58) Field of Classification Search
CPC ............ G01F 23/00; F16B 2/06; A47G 7/044
USPC ............... 116/227, 264, 266, 271, 229, 267; 248/315, 316.1, 200, 300; D8/349, D8/354; 73/866.3
See application file for complete search history.

(56) References Cited

U.S. PATENT DOCUMENTS

| | | | | |
|---|---|---|---|---|
| 975,127 A * | 11/1910 | Fuller | | 184/96 |
| 1,141,499 A | 6/1915 | Stahle | | |
| 1,448,842 A | 3/1923 | Gregory | | |
| 1,800,572 A * | 4/1931 | Simonsen | | 248/27.1 |
| 2,294,663 A * | 9/1942 | Huber | | 248/664 |
| 2,311,387 A | 2/1943 | Hastings | | |
| 2,325,582 A * | 7/1943 | Andersen | | 116/229 |
| 2,607,228 A * | 8/1952 | Coxon | | 73/715 |
| 2,721,390 A * | 10/1955 | Pasturczak | | 33/501 |
| 2,992,560 A | 7/1961 | Morgan et al. | | |
| 3,347,341 A * | 10/1967 | Avrea | | 184/108 |
| 4,848,154 A * | 7/1989 | Panzica | | 73/493 |
| 5,260,914 A * | 11/1993 | Roberts | | 368/10 |
| 5,357,815 A | 10/1994 | Williamson | | |
| 5,376,917 A * | 12/1994 | Yoshimoto et al. | | 340/438 |
| 6,041,650 A | 3/2000 | Swindler et al. | | |

(Continued)

OTHER PUBLICATIONS

Magnetel (TM) Rough Rider (TM) Liquid-Level Gauges M6300 Brochure, Jan. 20, 2010.

*Primary Examiner* — R. A. Smith
*Assistant Examiner* — Tania Courson
(74) *Attorney, Agent, or Firm* — Alvin R. Wirthlin

(57) ABSTRACT

A tilted gauge head for indicating liquid level within a container is operatively connectable to a liquid level sending unit. The gauge head includes a mounting base adapted for connection to the container, an indicator dial assembly operatively connectable to the liquid level sending unit for indicating liquid level, and at least one bracket with a rear mounting wall connected to the mounting base and a front mounting wall connected to the indicator dial assembly. The mounting walls are oriented at an acute angle with respect to each other such that the indicator dial assembly is oriented or tilted at the acute angle with respect to the mounting base. In this manner, the indicator dial assembly can more easily be viewed by a user from an angle to thereby reduce parallax reading errors.

20 Claims, 4 Drawing Sheets

(56) References Cited

U.S. PATENT DOCUMENTS

| | | |
|---|---|---|
| 6,089,086 A | 7/2000 | Swindler et al. |
| 6,170,328 B1 * | 1/2001 | Ross et al. ............ 73/305 |
| D662,000 S * | 6/2012 | Ross et al. ............ D10/101 |
| 2007/0096000 A1 * | 5/2007 | Westberg ............ 248/315 |
| 2008/0163707 A1 * | 7/2008 | Wu ............ 73/866.3 |
| 2009/0211177 A1 * | 8/2009 | Grafton et al. ............ 52/93.1 |
| 2011/0132254 A1 * | 6/2011 | Fujihira et al. ............ 116/62.1 |
| 2013/0167767 A1 * | 7/2013 | Trogdon ............ 116/26 |

* cited by examiner

US 9,304,027 B2

ANGLED GAUGE HEAD FOR LIQUID LEVEL SENDING UNIT

CROSS-REFERENCE TO RELATED APPLICATIONS

This application claims the benefit of U.S. Provisional Application No. 61/476,096 filed on Apr. 15, 2011, the disclosure of which is hereby incorporated by reference in its entirety.

BACKGROUND OF THE INVENTION

Delivery vehicles for pressurized fuel and other liquids, such as liquefied petroleum gas (LPG), propane, butane, and so on, typically include a large holding tank located rearwardly of the cab. A fuel sending unit is typically mounted on top of the tank and includes a float that rides on the surface of the liquid. The float is connected to a pivoting float arm which is in turn connected to the lower end of a driven shaft that rotates about its axis in response to float movement. A magnet is typically located at the upper end of the driven shaft for magnetically driving an indicator associated with a gauge head when the shaft rotates, to thereby display a liquid level condition of the tank to an observer.

As shown in FIG. 1, the prior art gauge head 1 is shown mounted on a vertical wall 2 of a tank 3 associated with a delivery vehicle. The gauge head 1 includes a mounting base 5 mounted on the vertical wall 2 of the tank. An indicator dial 4 extends parallel with the vertical wall 2 of the tank. A bracket 6 extends between the mounting base 5 and indicator dial 4 for securing the mounting base and indicator dial together. As shown, the eye 7 of a user is below the level of the indicator dial 4, causing the user to look upwardly towards the indicator dial. Depending on the position of the pointer (not shown) on the face of the dial (not shown), level reading errors can occur because of the parallax effect, i.e. the actual position of the pointer with respect to the dial face is different from the user's point of view, due to the angle at which the user must observe the pointer and dial face. Accordingly, actual liquid level in the tank will be different from the observed liquid level on the indicator dial 4.

It would therefore be desirous to provide a simple, straight forward solution that would reduce or eliminate parallax reading errors while avoiding high development and manufacturing costs associated with redesigning the gauge head, fuel sending unit and/or tank.

SUMMARY OF THE INVENTION

In accordance with one aspect of the invention, a gauge head for indicating liquid level within a container is operatively connectable to a liquid level sending unit. The gauge head includes a mounting base adapted for connection to the container, an indicator dial assembly operatively connectable to the liquid level sending unit for indicating liquid level, and at least one bracket with a rear mounting wall connected to the mounting base and a front mounting wall connected to the indicator dial assembly. The mounting walls are oriented at an acute angle with respect to each other such that the indicator dial assembly extends at the acute angle with respect to the mounting base. In this manner, the indicator dial assembly can more easily be viewed by a user from an angle to thereby reduce parallax reading errors.

In accordance with a further aspect of the invention, a gauge head for indicating liquid level within a container is operatively connectable to a liquid level sending unit. The gauge head includes: A) a circular mounting base adapted for connection to the container, the mounting base including openings extending along a periphery thereof; B) an indicator dial assembly being operatively connectable to the liquid level sending unit for indicating liquid level, the indicator dial assembly comprising: i) a rear bezel; ii) a dial housing supported by a circular flange formed in the rear bezel; iii) a dial face located within a circular depression of the dial housing, the dial face including indicia for indicating a level of liquid within a container; iv) a pointer mounted for rotation with respect to the dial face, wherein rotation of the pointer is proportional to a level of liquid within the container; v) a driven magnet assembly having a housing with the pointer connected thereto and at least one magnet located in the housing; vi) a needle bearing extending through the driven magnet assembly and fixedly connected to the dial housing for rotation of the driven magnet assembly in response to a level of liquid within the container; vii) a lens positioned over the dial face; viii) an annular gasket surrounding an outer periphery of the lens; and ix) a front bezel with an inner flange that receives the lens and gasket and an outer flange that receives the rear bezel for securing the indicator dial assembly together; and C) first and second brackets, each bracket having: i) a rear mounting wall connected to the mounting base; ii) a front mounting wall connected to the rear bezel of the indicator dial assembly; and iii) a side wall extending therebetween. The mounting walls are oriented at an acute angle with respect to each other such that the indicator dial assembly tilts at the acute angle with respect to the mounting base, whereby the indicator dial assembly can more easily be viewed by a user looking at the pointer and dial face from an angle to thereby reduce parallax reading errors.

In accordance with yet a further embodiment of the invention, a mounting bracket for orienting an indicator dial at an angle with respect to a mounting base of a gauge head includes a rear mounting plate adapted for connection to the mounting base, a front mounting plate adapted for connection to the indicator dial, and a side wall extending between the rear and front mounting plates. The front and rear mounting plates are oriented at an acute angle with respect to each other such that the indicator dial and mounting base are oriented at the acute angle when connected to the mounting bracket.

BRIEF DESCRIPTION OF THE DRAWINGS

The following detailed description of the preferred embodiments of the present invention will be best understood when considered in conjunction with the accompanying drawings, wherein like designations denote like elements throughout the drawings, and wherein.

It is noted that the drawings are intended to depict only exemplary embodiments of the invention and therefore should not be considered as limiting the scope thereof. It is further noted that the drawings may not be to scale. The invention will now be described in greater detail with reference to the accompanying drawings.

DETAILED DESCRIPTION OF THE INVENTION

Figure 1:
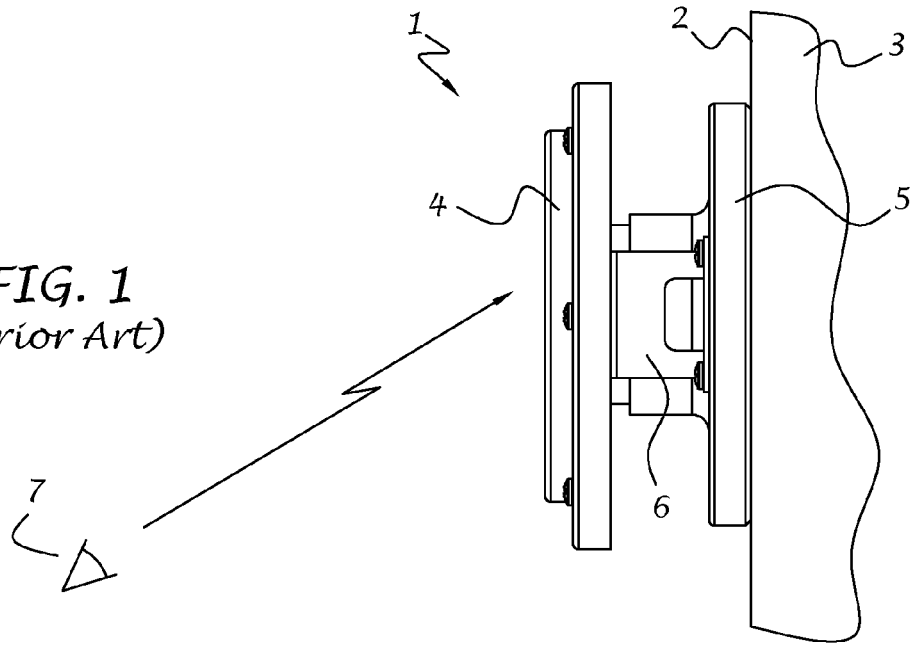
FIG. 1 is a side elevational view of a prior art gauge head mounted to a tank.
Figure 2:
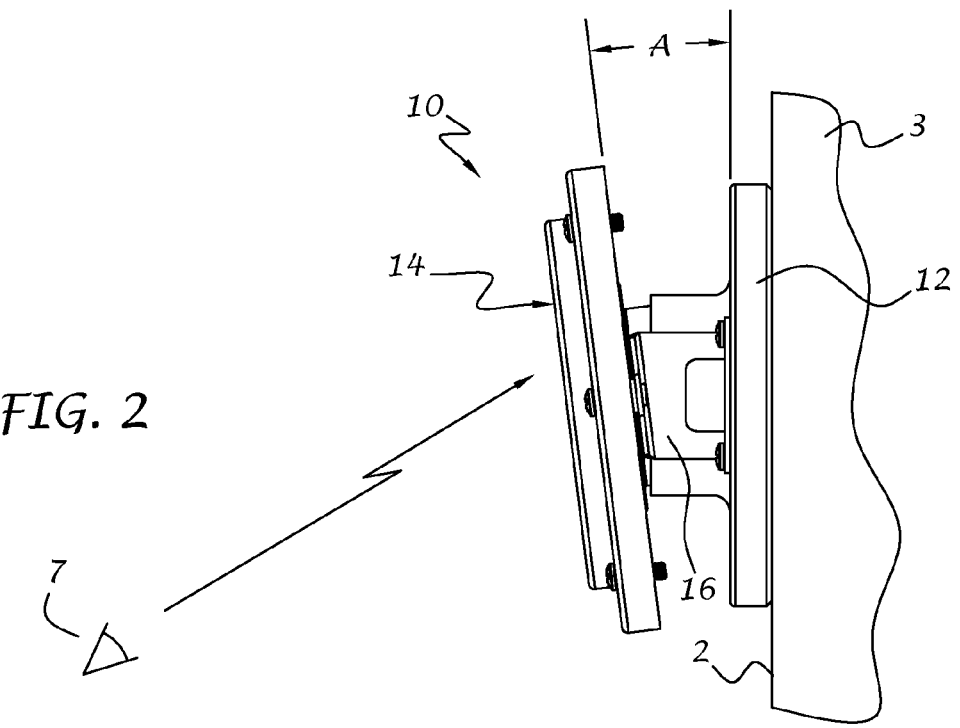
FIG. 2 is a side elevational view of a gauge head mounted to a tank in accordance with the present invention.
Figure 3:
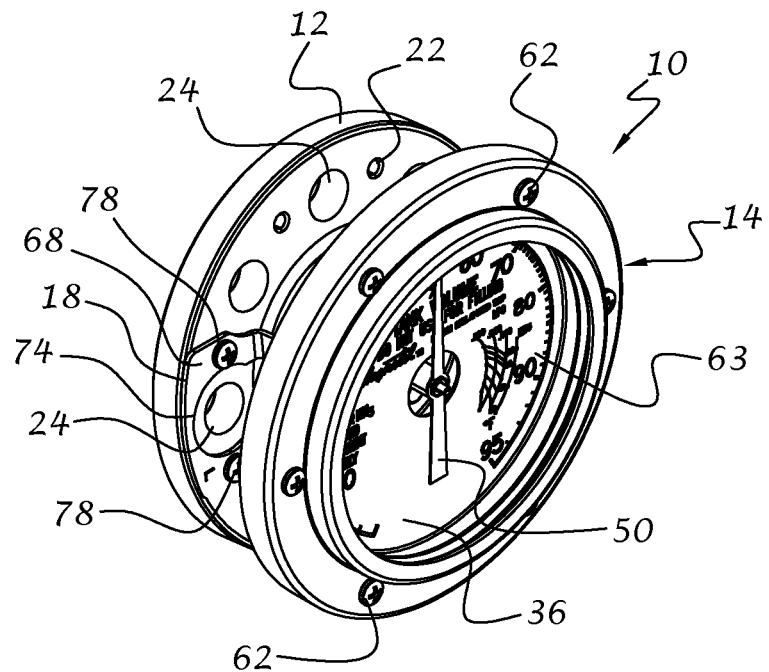
FIG. 3 is a left front isometric view of the gauge head of FIG. 2.
Figure 4:
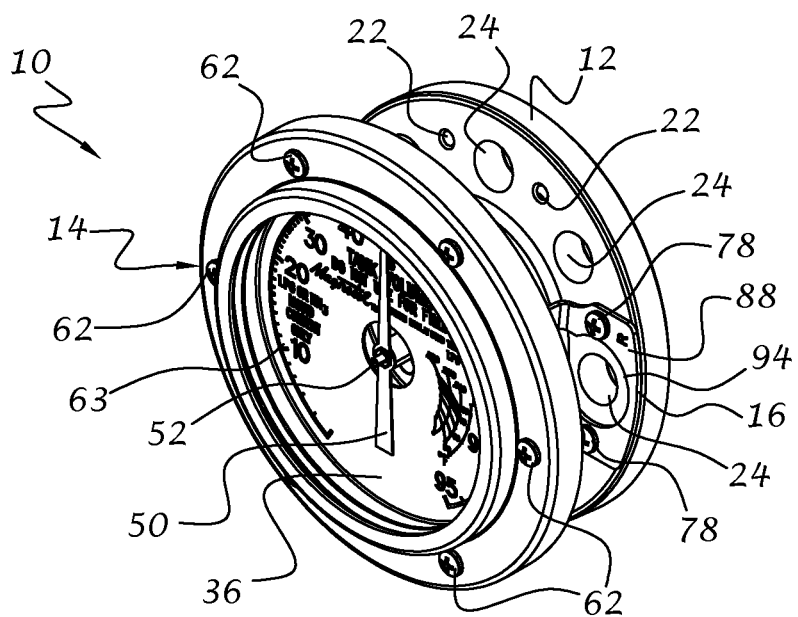
FIG. 4 is a right front isometric view thereof.

Referring now to the drawings, and to FIGS. 2-4 in particular, a gauge head 10 in accordance with an exemplary embodiment of the present invention is illustrated. The gauge head 10 is preferably associated with a liquid level sending unit (not shown) or the like for indicating the level of fluid in a container, such as a fuel tank, oil reservoir, radiator, brake fluid chamber, or any other container for holding and/or transporting a liquid (not shown). A suitable exemplary liquid level sending unit is disclosed in U.S. Pat. No. 5,357,815 assigned to Rochester Gauges, Inc., the disclosure of which is hereby incorporated by reference. Details of another suitable sending unit can be found in U.S. Pat. No. 6,041,650 assigned to Rochester Gauges, Inc., the disclosure of which is hereby incorporated by reference. However, it will be understood that other sending units can be used with the gauge head of the present invention without departing from the spirit and scope of the invention.

In accordance with one preferred application of the invention, the gauge head 10 is particularly useful with fuel senders mounted above eye level on a wall 2 (FIG. 2) of a tank 3 associated with a fuel delivery truck (not shown) for transporting fuel under pressure, such as liquefied petroleum gas (LPG), propane, butane, and so on. However, it will be understood that the gauge head 10 of the present invention can be used with any liquid level transducer in practically any application and/or location where a better view of the gauge head is desirous.

The gauge head 10 preferably includes a mounting base 12 adapted for mounting on the wall 2 of the tank 3, an indicator dial assembly 14 that extends at an acute angle with respect to the wall 2 of the tank, and a pair of brackets 16, 18 that are located between the mounting base 12 and indicator dial assembly 14 for securing the mounting base and indicator dial assembly together at a predetermined acute angle A so that the indicator dial assembly can be viewed more accurately by an observer.

Figure 5:
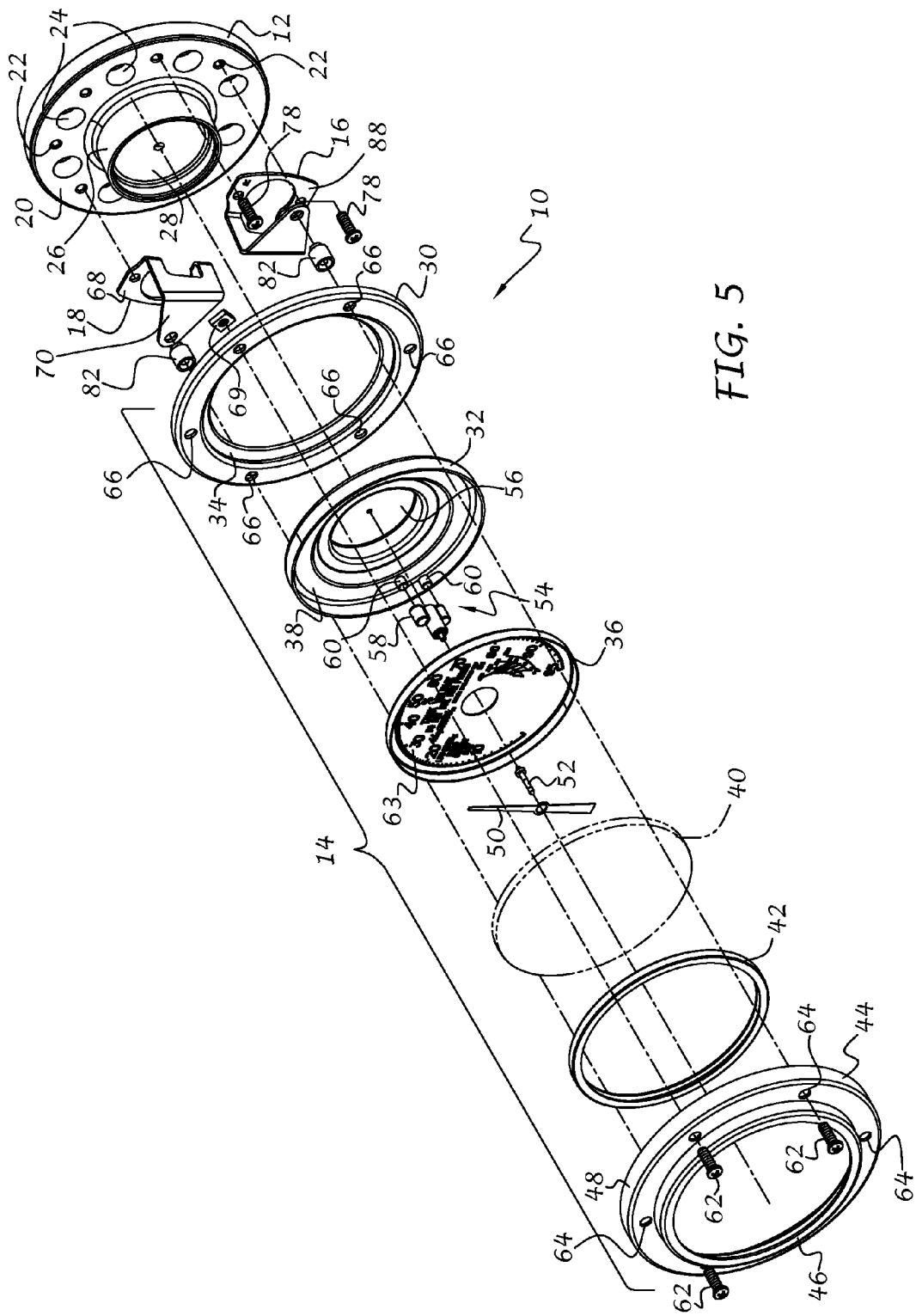
FIG. 5 is an exploded isometric view of the gauge head.

With additional reference to FIG. 5, the mounting base 12 preferably includes a circular base portion 20 with apertures 22, some or all of which may be threaded, and holes 24 positioned between the apertures 22 for reducing the weight of the mounting base 12. A circular wall portion 26 extends from the base portion 20 and includes a cavity or depression 28 for receiving a portion of the indicator dial assembly 14.

The indicator dial assembly 14 preferably includes a rear bezel 30 connected to the brackets 16 and 18, a dial housing 32 supported by a circular flange 34 formed in the rear bezel 30, a dial face 36 located within a circular depression 38 of the dial housing 32, a lens 40 positioned over the dial face 36, an annular gasket 42 surrounding an outer periphery of the lens 40, and a front bezel 44 with an inner flange 46 that receives the lens 40 and gasket 42 and an outer flange 48 that receives the rear bezel 30 for securing the components of the indicator dial assembly together.

A needle bearing 52 extends through a driven magnet assembly 54 and is preferably rigidly connected to the rear wall 56 of the dial housing 32. The driven magnet assembly 54 preferably includes a housing 58 rotatably mounted on the needle bearing 52 and a pair of magnets 60 located within the housing on opposite sides of the needle bearing. A pointer 50 is fixedly mounted on the housing 58 for rotation therewith. The magnets 60 are preferably cylindrical in shape and made of a high strength magnetic material, such as Neodymium, so that the driven magnet assembly is responsive to a driver magnet (not shown) of well-known liquid level sending units (not shown). Since the driven magnet assembly 54 is at an angle with respect to the sending unit, the provision of two axially opposed high strength magnets ensures that hysteresis effects are minimized when compared to prior art driven magnet arrangements. It will be understood that other magnetic materials, shapes and configurations can be used without departing from the spirit and scope of the present invention.

As shown in FIGS. 3-5, the indicator dial assembly 14 is preferably connected together by a plurality of threaded fasteners 62 that extend through openings 64 in the front bezel 44 and openings 66 in the rear bezel 30 and thread into corresponding nuts 69. In this manner, the dial housing 32, dial face 36, lens 40, and gasket 42 are securely sandwiched between the rear and front bezels 30 and 44, respectively. The dial face 36 preferably includes indicia 63 for indicating liquid level in conjunction with the pointer 50 in a well-known manner.

Figure 6A:
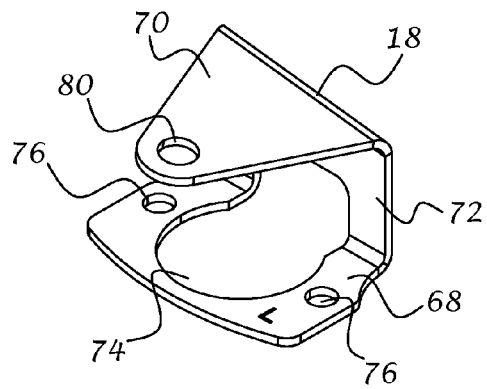
FIG. 6A is an isometric view of a left-side mounting bracket that forms part of the gauge head in accordance with the present invention.
Figure 7A:
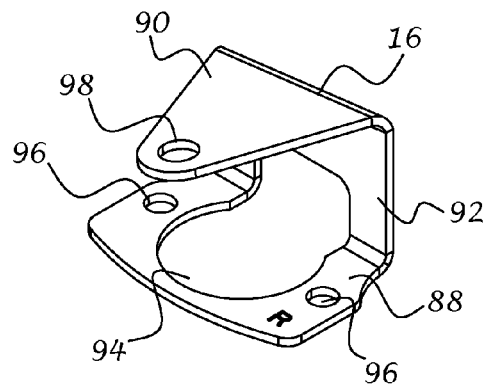
FIG. 7A is an isometric view of a right-side mounting bracket that forms part of the gauge head in accordance with the present invention.
Figure 6B:
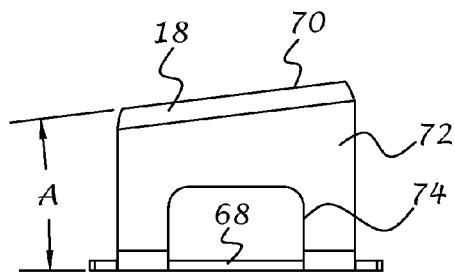
FIG. 6B is a rear elevational view thereof.
Figure 6C:
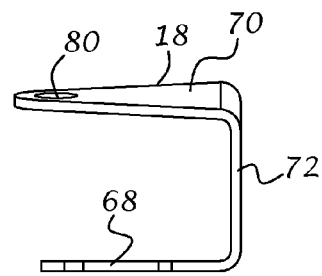
FIG. 6C is a side elevational view thereof.

With particular reference to FIGS. 6A-6C, the bracket 18 is arranged as a left-side bracket and is therefore preferably labeled with the designation "L" (FIG. 6A) to distinguish it from the right-side bracket, which is preferably labeled with the designation "R" (FIG. 7A). The bracket 18 is preferably generally U-shaped (FIG. 6C) and includes a rear mounting wall or plate 68, a front mounting wall or plate 70, and a side wall or plate 72 extending between the rear and front mounting plates. A central opening 74 is preferably formed in the rear plate 68 and side plate 72 that coincides with one of the openings 24 on the mounting base 12 (see FIG. 3). Mounting holes 76 are also preferably formed in the rear plate 68 on either side of the central opening 74 and are sized for receiving fasteners 78 (FIGS. 3 and 5) that thread into the apertures 22 for mounting the bracket 18 to the mounting base 12. The front plate 70 is preferably triangular in shape and includes a mounting hole 80 located proximal to an apex region of the front plate. The mounting hole 80 is sized to receive a spacer 82 (FIG. 5) and one of the fasteners 62 to mount the indicator dial assembly to the bracket 18. The spacer 82 ensures that there is sufficient clearance between the bracket 18 and rear wall 56 of the indicator dial assembly 14. A nut (not shown) or other threaded device can be located at the rear end of the fastener 62 for securing the components together.

As best shown in FIGS. 6B and 6C, the front mounting plate 70 extends at an acute angle A with respect to the rear mounting plate 68 such that the front mounting plate converges toward the rear mounting plate in a direction from right to left, as shown in FIG. 6B. In this manner, the indicator dial assembly is mounted at the acute angle A (FIG. 2) with respect to the mounting base 12 so that the dial face can more easily be viewed by the eye 7 of a user when the fuel sender is mounted above eye level on a tank 3 or at any other position were parallax reading errors may occur.

Figure 7B:
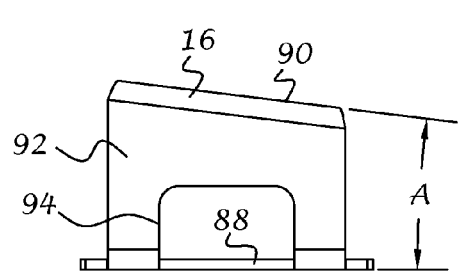
FIG. 7B is a rear elevational view thereof.
Figure 7C:
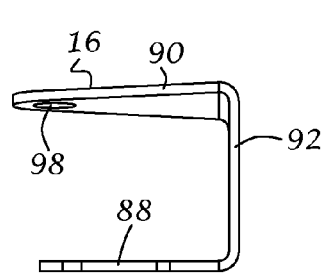
FIG. 7C is a side elevational view thereof.

With particular reference to FIGS. 7A to 7C, the bracket 16 is arranged as a right-side bracket and is therefore preferably labeled with the designation "R" (FIG. 7A). The bracket 16 is similar in construction to the bracket 18, and is therefore preferably generally U-shaped (FIG. 8C) and includes a rear mounting wall or plate 88, a front mounting wall or plate 90, and a side wall or plate 92 extending between the rear and front mounting plates. A central opening 94 is preferably formed in the rear plate 88 and side plate 92 that coincides with one of the openings 24 on the mounting base 12 (see FIG. 4). Mounting holes 96 are also preferably formed in the rear plate 88 on either side of the central opening 94 and are sized for receiving fasteners 78 (FIGS. 4 and 5) that thread into the apertures 22 for mounting the bracket 16 to the mounting base 12. The front plate 90 is also preferably triangular in shape and includes a mounting hole 98 located proximal to an apex region of the front plate 90. The mounting hole 98 is sized to receive a spacer 82 (FIG. 5) and one of the fasteners 62 to mount the indicator dial assembly to the bracket 16. The spacer 82 ensures that there is sufficient clearance between the bracket 16 and rear wall 56 of the indicator dial assembly 14. A nut (not shown) or other threaded device can be located at the rear end of the fastener 62 for securing the components together.

As best shown in FIGS. 7B and 7C, the front mounting plate 90 extends at an acute angle A with respect to the rear mounting plate 88 such that the front mounting plate converges toward the rear mounting plate in a direction from left to right, as shown in FIG. 7B (opposite of the FIG. 6B direction). Preferably the acute angles of the brackets 16 and 18 are identical. In this manner, the indicator dial assembly 14 is mounted at the acute angle A with respect to the mounting base 12 so that the dial face can more easily be viewed by the eye 7 of a user (FIG. 2) when the fuel sender is mounted above eye level on the tank 3. However, it will be understood that the angle between the front and rear mounting plates can differ for each bracket where it is desirous for the gauge head to tilt downwardly and to the right or left.

The brackets 16 and 18 are each preferably formed from sheet material, such as aluminum, steel, and so on, by stamping and bending, in accordance with well known practices. However, it will be understood that the brackets can be formed of other materials, such as plastics, glass-filled materials, composites, and so on, and can be shaped through other forming techniques such as injection molding, heat forming, etc., without departing from the spirit and scope of the invention.

It will be understood that the term "preferably" as used throughout the specification refers to one or more exemplary embodiments of the invention and therefore is not to be interpreted in any limiting sense.

It will be further understood that the term "connect" and its derivatives refers to two or more parts capable of being attached together either directly or indirectly through one or more intermediate members. In addition, terms of orientation and/or position as may be used throughout the specification denote relative, rather than absolute orientations and/or positions.

It will be appreciated by those skilled in the art that changes could be made to the embodiments described above without departing from the broad inventive concept thereof. For example, a single unitary bracket member incorporating the plates and angles of the separate right and left brackets can be provided without departing from the spirit and scope of the present invention. It will be understood, therefore, that this invention is not limited to the particular embodiments disclosed, but is intended to cover modifications within the spirit and scope of the present invention as defined by the appended claims.

What is claimed is:

1. A gauge head for indicating liquid level within a container, the gauge head being mountable above eye level on a wall of the container, the gauge head being operatively connectable to a liquid level sending unit and comprising:
    a mounting base being mountable above eye level on the wall of the container;
    an indicator dial assembly being operatively connectable to the liquid level sending unit for indicating liquid level; and
    at least one bracket having a rear mounting wall connected to the mounting base and a front mounting wall connected to the indicator dial assembly, the mounting walls being oriented at an acute angle with respect to each other such that the indicator dial assembly is oriented at the acute angle with respect to the mounting base;
    wherein the indicator dial assembly faces downwardly to facilitate viewing by a user positioned below the gauge head to thereby reduce parallax reading errors.

2. A gauge head according to claim 1, wherein the at least one bracket further includes a side wall extending between the front and rear mounting walls.

3. A gauge head for indicating liquid level within a container, the gauge head being operatively connectable to a liquid level sending unit and comprising:
    a mounting base adapted for connection to the container;
    an indicator dial assembly being operatively connectable to the liquid level sending unit for indicating liquid level; and
    at least one bracket having a rear mounting wall connected to the mounting base, a front mounting wall connected to the indicator dial assembly, and a side wall extending between the front and rear mounting walls, the mounting walls being oriented at an acute angle with respect to each other such that the indicator dial assembly is oriented at the acute angle with respect to the mounting base, whereby the indicator dial assembly can more easily be viewed by a user at an angle to thereby reduce parallax reading errors;
    wherein the at least one bracket comprises first and second brackets, the second bracket being a mirror image of the first bracket.

4. A gauge head according to claim 3, wherein the front mounting wall of each bracket is triangular in shape with a mounting hole extending through the front mounting wall near an apex thereof for connecting the indicator dial assembly thereto.

5. A gauge head according to claim 4, wherein the rear mounting wall of each bracket comprises a central opening and mounting holes located on either side of the opening for connecting the mounting base thereto.

6. A gauge head according to claim 5, wherein the mounting base comprises openings extending along a periphery thereof, the central opening of each bracket being aligned with one of the mounting base openings.

7. A gauge head according to claim 5, wherein the central opening of each bracket extends into the side wall.

8. A gauge head according to claim 3, wherein the indicator dial assembly comprises:
    a rear bezel connected to the first and second brackets;
    a dial housing supported by a circular flange formed in the rear bezel;
    a dial face located within a circular depression of the dial housing, the dial face including indicia for indicating a level of liquid within a container;
    a pointer mounted for rotation with respect to the dial face, wherein rotation of the pointer is proportional to a level of liquid within the container;
    a lens positioned over the dial face;
    an annular gasket surrounding an outer periphery of the lens; and a front bezel with an inner flange that receives the lens and gasket and an outer flange that receives the rear bezel for securing the indicator dial assembly together at the acute angle.

9. A gauge head according to claim 8, wherein the indicator dial assembly further comprises:
   a driven magnet assembly having a housing with the pointer connected thereto and at least one magnet located in the housing; and
   a needle bearing extending through the driven magnet assembly and fixedly connected to the dial housing for rotation of the driven magnet assembly in response to a level of liquid within the container.

10. A gauge head for indicating liquid level within a container, the gauge head being operatively connectable to a liquid level sending unit and comprising:
   a mounting base adapted for connection to the container;
   an indicator dial assembly being operatively connectable to the liquid level sending unit for indicating liquid level; and
   at least one bracket having a rear mounting wall connected to the mounting base and a front mounting wall connected to the indicator dial assembly, the mounting walls being oriented at an acute angle with respect to each other such that the indicator dial assembly is oriented at the acute angle with respect to the mounting base, whereby the indicator dial assembly can more easily be viewed by a user at an angle to thereby reduce parallax reading errors
   wherein the indicator dial assembly comprises:
   a rear bezel connected to the at least one bracket;
   a dial housing supported by a circular flange formed in the rear bezel;
   a dial face located within a circular depression of the dial housing, the dial face including indicia for indicating a level of liquid within a container;
   a pointer mounted for rotation with respect to the dial face, wherein rotation of the pointer is proportional to a level of liquid within the container;
   a lens positioned over the dial face;
   an annular gasket surrounding an outer periphery of the lens; and
   a front bezel with an inner flange that receives the lens and gasket and an outer flange that receives the rear bezel for securing the indicator dial assembly together at the acute angle.

11. A gauge head according to claim 10, wherein the indicator dial assembly further comprises:
   a driven magnet assembly having a housing with the pointer connected thereto and at least one magnet located in the housing; and
   a needle bearing extending through the driven magnet assembly and fixedly connected to the dial housing for rotation of the driven magnet assembly in response to a level of liquid within the container.

12. A gauge head for indicating liquid level within a container, the gauge head being operatively connectable to a liquid level sending unit and comprising:
   A) a circular mounting base adapted for connection to the container, the mounting base including openings extending along a periphery thereof;
   B) an indicator dial assembly being operatively connectable to the liquid level sending unit for indicating liquid level, the indicator dial assembly comprising:
      i) a rear bezel;
      ii) a dial housing supported by a circular flange formed in the rear bezel;
      iii) a dial face located within a circular depression of the dial housing, the dial face including indicia for indicating a level of liquid within a container;
      iv) a pointer mounted for rotation with respect to the dial face, wherein rotation of the pointer is proportional to a level of liquid within the container;
      v) a driven magnet assembly having a housing with the pointer connected thereto and at least one magnet located in the housing;
      vi) a needle bearing extending through the driven magnet assembly and fixedly connected to the dial housing for rotation of the driven magnet assembly in response to a level of liquid within the container;
      vii) a lens positioned over the dial face;
      viii) an annular gasket surrounding an outer periphery of the lens; and
      ix) a front bezel with an inner flange that receives the lens and gasket and an outer flange that receives the rear bezel for securing the indicator dial assembly together; and
   C) first and second brackets, each bracket having:
      i) a rear mounting wall connected to the mounting base;
      ii) a front mounting wall connected to the rear bezel of the indicator dial assembly; and
      iii) a side wall extending therebetween;
      iv) the mounting walls being oriented at an acute angle with respect to each other such that the indicator dial assembly tilts at the acute angle with respect to the mounting base, whereby the indicator dial assembly can more easily be viewed by a user looking at the pointer and dial face from an angle to thereby reduce parallax reading errors.

13. A gauge head according to claim 12, wherein the second bracket is a mirror image of the first bracket.

14. A gauge head according to claim 13, wherein the front mounting wall of each bracket is triangular in shape with a mounting hole extending through the front mounting wall near an apex thereof for connecting the indicator dial assembly thereto.

15. A gauge head according to claim 14, wherein the rear mounting wall of each bracket comprises a central opening and mounting holes located on either side of the opening for connecting the mounting base thereto.

16. A gauge head according to claim 15, wherein the central opening of each bracket extends into the side wall.

17. A mounting bracket for orienting an indicator dial at an angle with respect to a mounting base of a gauge head, the mounting bracket comprising:
   a rear mounting plate adapted for connection to the mounting base, the rear mounting plate having a central opening and at least one mounting hole located on at least one side of the central opening for connecting the mounting base thereto;
   a front mounting plate adapted for connection to the indicator dial; and
   a side wall extending between the rear and front mounting plates;
   wherein the front and rear mounting plates are oriented at an acute angle with respect to each other such that the indicator dial and mounting base are oriented at the acute angle when connected to the mounting bracket.

18. A mounting bracket according to claim 17, wherein the front mounting plate is triangular in shape with a mounting hole extending through the front mounting plate near an apex thereof for connecting the indicator dial assembly thereto.

19. A mounting bracket according to claim 18, wherein the at least one mounting hole comprises a plurality of mounting holes located on either side of the opening for connecting the mounting base thereto.

20. A gauge head according to claim 18, wherein the central opening extends into the side wall.

\* \* \* \* \*